Sept. 2, 1969  O. C. STAMPS ET AL  3,464,626
AGRICULTURAL CHEMICAL APPLICATION PROCESS
AND APPARATUS THEREFOR
Filed April 1, 1968  2 Sheets-Sheet 1
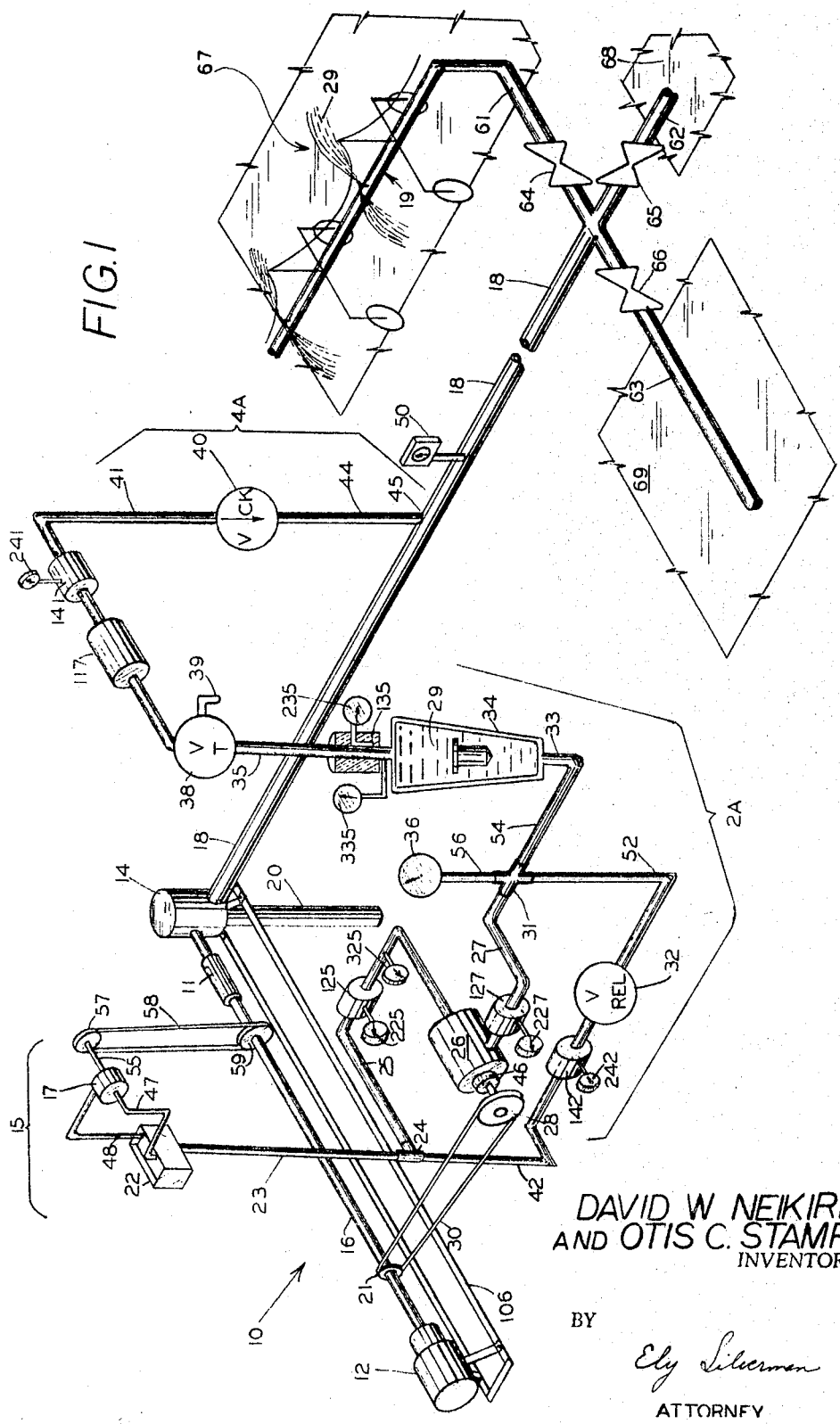
DAVID W. NEIKIRK
AND OTIS C. STAMPS
INVENTORS
BY
Ely Silverman
ATTORNEY

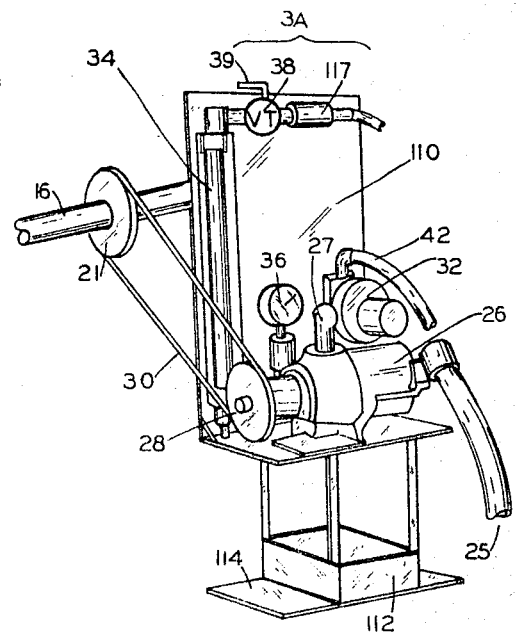
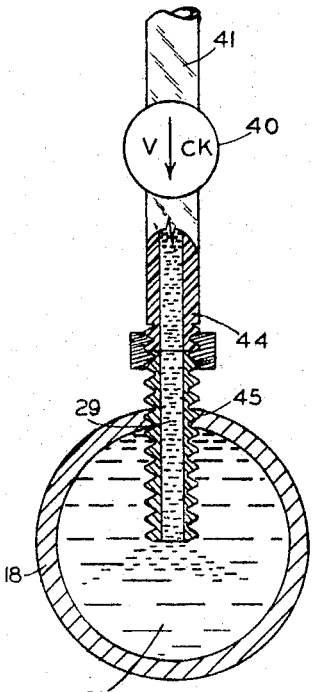
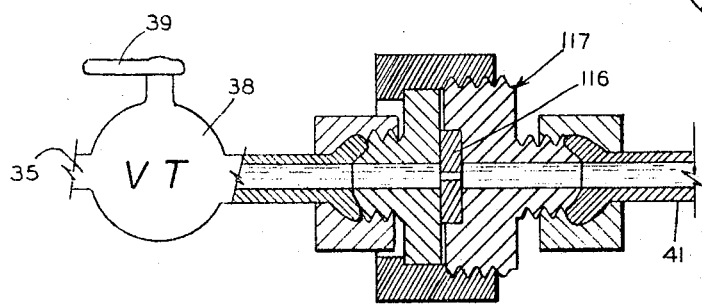

United States Patent Office 3,464,626
Patented Sept. 2, 1969

3,464,626
AGRICULTURAL CHEMICAL APPLICATION
PROCESS AND APPARATUS THEREFOR
Otis C. Stamps and David W. Neikirk, Clovis, N. Mex.,
  assignors to Inject-O-Meter Manufacturing Company,
  Inc., Clovis, N. Mex., a corporation of New Mexico
Continuation-in-part of application Ser. No. 632,081,
  Apr. 19, 1967, which was a continuation-in-part of
  application Ser. No. 546,443, Apr. 29, 1966. This
  application Apr. 1, 1968, Ser. No. 717,515
The portion of the term of the patent subsequent to
  June 20, 1984, has been disclaimed
    Int. Cl. A01g 25/02; B05b 15/00
U.S. Cl. 239—10                                10 Claims

ABSTRACT OF THE DISCLOSURE

A process of applying water insoluble herbicides and, the like by a high energy pump system incorporating a high intensity dispersion step with an irrigating apparatus and effecting application of such materials to farm land at a substantially constant weight per unit area of land at any of several desired levels of intensity.

CROSS REFERENCE TO RELATED APPLICATIONS

This application is a continuation-in-part of our pending application Ser. No. 632,081, filed Apr. 19, 1967, to be issued as U.S. Patent No. 3,375,976, Apr. 2, 1968, which application was a continuation-in-part of our application Ser. No. 546,443, filed Apr. 29, 1966, now Patent No. 3,326,232, issued June 20, 1967.

BACKGROUND OF THE INVENTION

The field of this invention is the application of chemically active insecticide and fungicide and herbicide to field and crop.

Description of the prior art

The development of insecticides and fungicides is described generally in Plant Diseases, Yearbook of Agriculture 1953, pages 115–120, chapter entitled "How Fungicides Have Been Developed," U.S. Department of Agriculture, Washington, D.C.; apparatus is also there described at pages 117 to 120. The current state of the art is shown in Protecting Our Food, Yearbook of Agriculture 1966, chapters entitled "Fight Against Insects," pages 27–20; "Extension and Pesticide Know-How," pages 208–215; and "Science Against Weeds," pages 74–82, U.S. Department of Agriculture, Washington, D.C.

The problem involved in the prior art solved by this invention is that, while even application of herbicides, fungicides and insecticides is necessary to evoke the advantageous differential characteristics of these materials and also to avoid loss of these relatively expensive materials and to avoid dangerous residues thereof, such materials when they are not readily dispersible in water usually settle out of water and are regarded as insoluble therein, organic solutions are expensive and hazardous and, even though spray operation is acknowledged as desirable the labor cost of such application is high and, until this invention, had been deemed to require special equipment.

SUMMARY OF THE INVENTION

We have determined that herbicides and other agricultural chemicals deemed substantially water insoluble may be effectively and economically applied, with a combination of apparatus including conventional irrigation equipment, by dispersion of such compositions in the water used to irrigate the land for the crops for which crop such compositions are to be applied. The dispersion is accomplished by using a very large input energy source, such as an irrigation pump engine, to develop a sufficient energy input, in combination with an orifice, to so disperse the relatively water insoluble materials, such as herbicides, as to form a water suspension thereof of sufficient stability to permit the transport of such chemicals to and through irrigation distribution apparatuses to the to-be-treated field and the crop thereon, and so provide for applying such compositions and materials to the land at a substantially constant weight per unit area of the land at any of several desired levels of intensity.

Accordingly, one object of this invention is to provide a process to deliver reliably a quantitatively controllable supply of herbicide and the like to land by an irrigation line and apparatus relatively independent of the normal operational variation in solid content, pressure and volume of flow of water therethrough.

A further object of this invention is to provide an apparatus whereby to readily change and control the delivery of a predetermined quantity of herbicide and the like to and through an irrigation system and thereby to farm land.

Yet another object of this invention is to provide an apparatus readily installed and simple to use in the field.

Another object of this invention is to provide a reliable quantitatively controllable process to supply herbicides and the like to land.

A further object of this invention is to provide a process whereby to readily change and control delivery of a desired quantity of herbicide to the farmland.

Other objects of this invention will be apparent to those skilled in the art on a study of the description in the below specification and drawings, of which description the drawings form a part and wherein the same number refers to the same part throughout.

Another object of this invention is provide an apparatus to deliver reliably a quantitatively controllable supply of insecticide or pesticide to land and crops by an irrigation line and apparatus relatively independent of the normal operational variation in solid content, pressure and volume flow of water therein.

BRIEF DESCRIPTION OF THE DRAWINGS

FIGURE 1 is a diagrammatic isometric overall view of a complete apparatus and system according to this invention during its operation.

FIGURE 2 is a perspective view of the portion of the apparatus shown in zone 2A of FIGURE 1.

FIGURE 3 is an enlarged view of zone 3A in FIGURE 2.

FIGURE 4 is an enlarged view of zone 4A of FIGURE 1.

TABLE I.—CHARACTERISTICS OF MATERIALS USED

| Example No | 1 | 2 | 3 |
|---|---|---|---|
| Common or trade name | Atrazine | Dacthal | Propazine. |
| Manufacturer | Geigy Co | Diamond Shamrock Corporation. | Geigy Co. |
| Chemical name | See (a) below | See (b) below | See (c) below. |
| Soluble in | Insoluble | Insoluble | Insoluble. |
| Available as | Wettable powder | Wettable powder | Wettable powder. |

(a) 2-chloro-4(ethyl-6-isopropylamino)-sec-triazine.
(b) dimethyl ester of tetrachloroterephthalic acid.
(c) 2-chloro-4,6-bis(dipropylamino)-sec-triazine.

DESCRIPTION OF THE PREFERRED EMBODIMENT

In a preferred embodiment of the invention the overall apparatus 10 comprises a conventional internal combustion engine 12 which is attached to and drives the well pump 14 by a rigid cylindrical shaft 16 therebetween and operatively connected to both. Water 60 is obtained from a well 20, by the action of the pump 14. The pump 14 discharges into a well pump discharge line 18; line 18 is operatively connected to a sprinkler irrigation apparatus 19.

A supply tank, 22, is operatively connected by a tank discharge line 23 to one inlet arm of a T 24.

A liquid agitator assembly 15 is operatively connected to a power source therefor. The agitator assembly is operatively connected to the interior of the supply tank 22 to mix a liquid solid mixture in the tank 22.

The other inlet arm 42 of the T is operatively connected to the discharge outlet of a pressure relief valve 32. The outlet arm of the T is connected to the inlet line 25 of a liquid pump 26. The pump 26 discharges liquid by the pump outlet line 27. The impeller of pump 26 is driven by a pulley wheel 28. Wheel 28 is operatively attached by belt 30 to the shaft 16. The outlet line 27 is directly connected to the inlet arm of a cross 31.

The three outlet arms 52, 54, and 56 of the cross 31 are respectively operatively connected to the inlet of an adjustable pressure relief valve 32, a flowmeter 34 and a Bourdon pressure gauge 36. Arm 54 is operatively connected to the inlet 33 of flowmeter 34. The outlet of meter 34 is operatively connected to the flowmeter outlet line 35. The outlet line 35 feeds directly into and is operatively connected to a throttle control valve 38. The action of valve 38 is readily controlled by the handle 39 thereof. The control valve outlet is connected by the check valve line 41 to a check valve 40. The check valve 40 discharges through an entry line 44 into a nipple 45 welded to the outside of and open to the interior of the well pump discharge line 18; it (45) projects to the center of the line 18 and delivers a suspension 29 thereto.

Line 18 is provided with a tap to record pressure by a pressure recording gauge 50. Line 18 is the main irrigation line and is connected by valved branches 61, 62, and 63 each provided with valves 64, 65 and 66 respectively, for connection to a site on fields as 67, 68 and 69 respectively, to provide for operative connection of a sprinkler apparatus, as 19, thereto.

The lines 23, 25, 27, 52, 54 and 44, 56, 41 and 42 are all ½ inch internal diameter nylon mesh reinforced transparent polyvinyl chloride tubing as it has excellent chemical and weather resistance.

There are no valves between the line 44 and the line 18, and the line 44 being transparent, any encrustations therein can be readily corrected by removal and replacement of the line 44.

While 38 herein is a common ball valve, a rotatable vertically elongated hollow cylindrical and perforated valve body and a fixed casing assembly 80 operatively attached to each other, as shown in FIGURES 3 to 6 of our application Ser. No. 546,443, wherein orifices of different sizes are located in each of the different passageways may be used.

However, in the preferred embodiment of this invention the throttle control valve 38 is a metering ball valve and is followed by an orifice plate 116 of predetermined size. The ball valve is kept wide open and the orifice plate held in an orifice plate holder 117 as shown in FIGURES 1, 2 and 3. The orifice holes are cylindrical and coaxial with the lines in which used. Test data on the diameter and flow through each such orifice plate (standing alone) are as set out in Table II. The orifice plates are made of stainless steel and all edges thereof are square.

While the agitator assembly 15 may comprise a motor and agitator shaft of adequate power to prevent the material added to the water from settling, in the preferred embodiment a centrifugal pump 17 is used. The inlet line 47 of the centrifugal pump 17 opens downwardly and extends to near the bottom of the tank 22 at one side of that tank. The outlet line 48 of the pump 17 extends to the middle of the tank near the opposite side and is directed downwardly. Pump 17 is driven by its pump shaft 55 which is operatively attached to the impeller of such pump. Shaft 55 is firmly joined to a driven pulley 57 which pulley 57 is driven by a belt 58 which belt is driven by a drive pulley 59, which pulley 59 is firmly attached to the shaft 16 and is driven thereby. Accordingly the assembly 15 provides for drawing a liquid-solid mixture from near the bottom of the tank 22 and forcefully returning it back to the tank 22 and thereby preventing material therein from settling. A clutch 46 may be interposed between the pulley 28 and the motor 26 to permit the motor 12 to agitate the material in the tank 22 whether or not water is being pumped from the well 20 by the pump 14 and whether or not the pump 26 is operating.

In the preferred embodiment of apparatus shown the motor 12 and the pump 14 are supported on a rigid steel frame 106 therebetween to facilitate the handling thereof and to fix the relations therebetween. The frame is made of steel ells or channels with rigid steel bridging members therebetween. The elements 25, 26, 27, 28, 31, 32, 33, 34, 35, 36, 38 and 117 are firmly fixed to a rigid panel 110 which is formed of sturdy steel plate. The panel 110 is fixedly attached to and supported on an adjustable vertical support 112 which is firmly attached to a footing 114 which is firmly fixed in the ground adjacent to the frame 106. The leg 112 is adjustable as to height on footing 114. This permits the removal of the entire panel 110 and all parts associated therewith as needed.

In the presently preferred embodiment characteristics of the apparatus used are given in Table III. In Table IV characteristics of the below described operation of such apparatus are given using materials as in Table I.

For control of the operations of this process provisions for measurement of temperature and pressure are made, particularly in the neighborhood of the orifice whereat a pressure drop occurs between the flowmeter 34 and the pump discharge line 18. At each of points 125, 127, 142, 135 and 141, a standardly available Johnson & Johnson surgical absorbent cotton, about four to five wide and from one to two inches in thickness was wrapped around the pipe and/or apparatus portions whereat the temperature was read: at each such point a substantially identical thermometer, 225, 227, 242, 235, and 241 respectively is used. The stem of each of these thermometers had a length of six inches and each of these substantially identical thermometers had a temperature range of −40° F. to +120° F.; the stem of each such thermometer was graduated and separately indicated each two degrees of Fahrenheit. The bulb of each such thermometer was located as close as possible to or adjacent the pipe or apparatus portion being measured and within the cotton wrapping. Each thermometer was held in its position for at least about 15 minutes when a stable temperature reading was achieved thereon; this stable temperature reading is that which is given in the below examples, all the thermometers were so held and read at substantially the same time during any one example.

TABLE II

| (1) Orifice plate diameter of orifice (inches) | (2) Thickness of plate (inches) | (3) Pounds pressure across plate | (4) Water (gallons per hour) flow through orifice |
| --- | --- | --- | --- |
| .014 | .0125 | 40 | 1.50 |
| .024 | .0125 | 40 | 4.44 |
| .037 | .0250 | 40 | 9.60 |
| .063 | .0250 | 40 | 30.00 |
| .089 | .0250 | 40 | 60.00 |
| .120 | .0250 | 40 | 108.00 |

TABLE III

| Item | Ref. | Description |
| --- | --- | --- |
| Pump | 26 | Robbins Myers model FS-22C, capacity 150 gallons per hour at 150 p.s.i.g. and also as shown in United States Patents 2,545,625 and 2,545,626. |
| Bourdon pressure gauge | 36 | Range 0–200 p.s.i.g. withstands corrosive materials. |
| Pressure relief valve | 32 | To withstand corrosion: Capacity 5–200 p.s.i., Fisher Governor Co., Bulletin C-98H, orifice size ½″. |
| Flow meter | 1 34 | Fisher and Porter Catalog "Flow Rater" Model 10A356A, ½″. |
| Piping | 23, 25, 27, 35, 41, 42, 52, 54. | ½″ i.d. nylon reinforced transparent P.V.C. tubing. |
| Pump | 14 | 1,100 g.p.m. capacity. |
| Motor | 12 | 413 in. 3 Chrysler. |
| Irrigator | 19 | Valley, U.S.P. 2,604,359. |
| Line | 18 | Diameter 8″ length to irrigator, 100′ to 2,500′. |
| Valve | 38 | Ball valve as shown in Holland & Chapman "Pumping of Liquids," Reinhold Publishing Co., 1966, figures 4-8-A; sold as Cabot P.V.C. ½″ ball valve female connectors at both ends. |
| Pump | 17 | Viking-Cast Iron Gear Pump FH-78 #66195: Capacity = 1-200 p.s.i.; Volume= 1-100 g.p.m. |

[1] The flow meter 34 capacity is 67 gallons per hour at full rating of 100 on its scale, the scale reads from 0 to 100, the reading on the scale is directly proportional to the flow through the flow-meter between 10 and 90. (The float is different from that used in Application Serial No. 546,443.)

EXAMPLES OF OPERATIONS

Example 1

In operation, as the herbicide Atrazine is stirred by agitator 15 with water in the container 22 to prevent the powder from settling, the resulting liquid suspension solution mixture, hereinafter referred to as the suspension 29, flows from container 22 to line 18: the suspension 29 passes from the container 22 by the line 23 and the T 24 to the pump 26 on the panel 110. The rotation of the shaft 16 between the motor 12 and the pump 14 and the operative connection of the belt 30 to shaft 16, as by pulley 21, or directly, drives the belt 30. The belt 30 drives the pulley wheel 28. Pulley 21 is firmly fixed to the shaft 16. Pulley wheel 28 is directly connected to pump 26 and the pump drives the suspension 29; to the cross 31 at a pressure shown on gauge 36. The line 56 operatively connects to the gauge 36 to indicate the pressure at the cross and the suspension 29 passes, when pump 26 is operating, from the T 31 towards the adjustable release valve 32, but not through it unless the pressure in line 52 rises above the pressure value set for the adjustable pressure release valve, and towards and to the flow-meter 34. The suspension 29 passes through the meter 34 to the line 35 and thence to the control valve 38. The suspension 29 passes through the valve 38 at a rate dependent upon the pressure in line 35 and the orifice size (see Table II) and the pressure in line 41. If no orifice plate 116 is used then the suspension 29 passes through the valve 38 at a rate dependent upon the pressure in line 35 and the orifice through valve 38 as set by its handle 39 and the pressure in line 41. Suspension 29 then passes through the line 41 to the check valve 40 which is firmly located on top of the line 18. The suspension 29 then, in the usual operation of the process of this invention, passes through the line 44 and the nipple 45 into the line 18. Concurrently with the above operation the pump 14 raises water from well 20 and forces it through the line 18 usually at 50 to 150 p.s.i. pressure past the nipple 45 through pipelines as 61 to the field 67 or through line 62 to the field 68 or through the line 63 to the field 69. Each of the lines 61, 62 and 63, is provided respectively with a shut-off valve 64, 65 and 66. Thereby the flow of the water from the well 20 is controlled to any of the lines 61, 62 or 63 and thence to the apparatus 19. The apparatus 19, used in the preferred embodiment, is known as a Valley Sprinkler and described in United States Patent 2,604,359 and distributes the liquid from line 61 to the field 67 while the water from well 20 is pumped thereto. Accordingly, by this process the water from the well 20 is supplied with herbicide from a tank 22 and such water mixed with herbicide is applied to a field as 67, and crops thereon.

After delivery of the required amount of water to a field as 67 the valve as 64 to the irrigation apparatus 19 is closed and the irrigator apparatus 19 is then moved to another position so as to connect to line 62. The line 18 is then connected to the irrigator apparatus 19 and sprinkling is again begun. At the time when the valve 64 is closed the pressure in the line 18 rises. The pump 14 should be shut prior to the shutting off of the valve but this is not always done and is not necessary according to this process. On shutting down the valve 64, with 65 and 66 also closed, the check valve 40 closes and the valve 32 is opened whereupon suspension 29 is no longer transferred from the tank 22 to the line 18 until the irrigator is operatively connected to line 18. The check valve 40 is also closed automatically when there is difficulty with the irrigator 19 which raises the pressure in line 18.

Generally the greatest and controlling resistance of flow of suspension 29 through the flowmeter 34 is (as illustrated by the data of Table IV below) provided by the orifice plate 116: the pump 26 has a sufficiently large capacity to overcome line pressure variations except for the largest slugs of pressure as due to closing of valves 64, 65 or 66 and such surges close the check valve 40.

The amount of fluid passing through meter 34 is adjusted to a higher rate of flow by adjustment of the setting of the relief valve 32 to sustain a higher pressure prior to returning the suspension 29 through the return line 42 and concurrently enlarging the orifice as through plate 116 to provide a lesser resistance to flow through the meter 34 while still maintaining the controlling relationship of the pressure drop through the plate 116 to the flow from liquid source 22 to the line 18. This relationship is assured by having a pressure drop of at least 30 p.s.i. from meter 36 to line 18 when the flow of suspension 29 is about ¼ a gallon per minute. Too low a pressure drop makes the flow through meter 34 too sensitive to pressure changes in line 18: too high a pressure drop renders the operation of the check valve and pressure release valve 32 too insensitive to stoppages in line 18 and applicator 19. Suspension 29 flows from valve 38 and plate 116 through the line 41, valve 40 and line 44 into the line 18. This relationship of apparatus and process provides that the resistance provided by the control valve 38 and plate 116 is a controlling factor to flow and minor variations in pressure, volume, etc., density of the irrigating water in line 18 and minor variations in pressure in line 18 do not affect the substantially constant rate of flow of suspension 29 from the tank 22 into the line 18 and field as 67 notwithstanding the variations in pressure and volume that occur within the line 18 due to the inherent characteristics of the operation of the pump 14 and the apparatus 19. Further still, this constant flow from the line 22 to the line 18 provides that there are no oscillations added to the flow pattern of the water through the line 18 such as are caused by an irregular stopping and starting of flow into the line 18; rather, there is a steady flow and pressure from the line 44 into the line 18.

As this system takes its driving power from the shaft 16 of the irrigation engine 12, should the irrigation engine shut down for any reason the pumping of suspension 29 from the container 22 automatically stops. Accordingly, no chemicals are wasted and no excessive concentration of suspension 29 is provided in the portion of water then in the line 18 for subsequent distribution to the field as 67.

During usual operation of apparatus 10 the irrigation line pressure usually oscillates for a range of about 2 pounds per square inch with oscillations at the frequency of 3 or 4 cycles every 15 minutes with other minor oscillations superimposed thereon; while there is an occasional dip in line 18 pressure there is a corresponding increase in flow reading of only 1% as a change in the rate of flow of suspension 29 while no adjustments need be made to any gauge or valve on this apparatus 10 notwithstanding periodic and repeated 1–2 p.s.i. line pressure changes there is no appreciable change in the suspension 29 flow rate and even a 7–8 p.s.i. line pressure change produced very little change in flow rate of the suspension 29.

The apparatus of FIGURES 1–3 is adapted to apply suspensions as 29 to large fields, e.g., of 132 acre size, as described in our copending application Ser. No. 632,081 and in our earlier application Ser. No. 546,443.

The pump 14 then used is a booster pump and is operatively connected to the water source, well 20, by a series of four other engines and pumps; it pumps 1,100 gallons per minute average.

Apparatus 19 is 1,285 feet long from center pivot to outer end. It stays at each position as end of line 61 in field 67 for 200 hours. Its outer station (56 feet from outer end of apparatus 19) moves 6 inches every 55 seconds. Thus the coverage is 36,960 gallons per acre.

In ordinary operation, water is pumped from a well as 20 to the irrigator 19 for a time dependent on the amount of water needed by the land and the capacity of the well. The chemicals applied by irrigation according to this invention are applied at a certain rate of weight as desired at the time while the rate at which the water will flow to the land through the apparatus depends on the capacity of the well to deliver varying amounts of water and the capacity of the land to absorb the water. Accordingly the operation according to this invention provides a given weight of such chemicals per unit area of land independent of other limiting factors.

Most herbicides, such as Atrazine, Propazine and Dacthal, are insoluble in water although they are available as wettable powders; also insecticides such as emulsifiable Rhothane (dichloro-diphenyl-dichloroethane also known as TDE or DDE) are available also as wettable powders, many (dichloro-diphenyltrichlorothane) modern insecticides are not soluble in water as are many fungicides such as Captan (N-trichloromethylmercapto-4-cyclohexene-1,2-dicarboximide, otherwise known as N-trichloro-methiotetrahydrophthalimide and Orthocide 406) and Ferbam (ferric dimethyldithiocarbamate).

As insecticides and herbicides are frequently referred to as pesticides the group of water insoluble insecticides and water insoluble fungicides and water insoluble herbicides are accordingly referred to herein as "herbicides and the like" because of such similar chemical characteristics and their similar field of use.

The apparatus 10 is not limited for use with herbicides but also can be used with such insecticides and pesticides. Also the apparatus 10 is not limited for use with sprinkler irrigation systems, either traveling or stationary, but also can be used in flood type irrigation.

The above description of operation of apparatus 10 with Atrazine is typical of its operation with water-insoluble yet wettable powders such as Atrazine, Propazine and Dacthal, some aspects of which operation are more particularly described herebelow.

In the specific example of operation according to the above description, one pound of Atrazine herbicide as −50 mesh wettable powder is mixed in container 22 with fifteen gallons of water sufficiently intensely to provide a suspension that will remain suspended for one to two minutes. Using a No. 37 orifice (as in Table II) with a flow-meter 34 having a 67 gallon per hour rating the readings thereon were unchanging during the operation of the apparatus 10 as above, for example:

| Time—minutes of operation— | Reading |
|---|---|
| 0 | 27 |
| 7 | 27 |
| 23 | 27 |
| 39 | 27 |

This rate of feed corresponds to a predetermined feed rate from line 44 of one pound of Atrazine per hour, and is effected without adjustment of valve 38. The suggested feed rate of Atrazine is one pound per acre and this feed rate provides for the application of one pound of Atrazine to an acre in an hour. This is accomplished notwithstanding any variation in pressure and solid content of water in line 18 and as above described and substantiated in detail by the data provided in our application Ser. Nos. 632,081 and 546,443.

Example 2

In another example of operation according to the above description, 1.34 pounds of Propazine herbicide as wettable powder is mixed in container 22 with fifteen gallons of water sufficiently intensely to provide a suspension that will remain suspended for one to two minutes. Using a No. 63 orifice (as in Table II) with a flow-meter 34 having a 67 gallon per hour rate the readings thereon were unchanging during the operation of the apparatus as follows:

| Time—minutes of operation— | Reading |
|---|---|
| 0 | 76 |
| 67 | 76 |
| 105 | 76 |

This even rate was accomplished notwithstanding any variation in pressure and solid content of water in line as 18 and as above described and substantiated by the data provided in application Ser. Nos. 632,081 and 546,443.

Example 3

In another example of operation according to the above description, one half-pound of Dacthal herbicide as −50 mesh wettable powder is mixed in container 22 with 10 gallons of water sufficiently intensely to provide a suspension that would remain suspended for one to two minutes.

In this example, the dispersion of the water-insoluble powder is effected by the orifice effect of the valve 38; the valve 38 is adjusted until, with a given pressure value at 36 and 32 and 50, the pressure drop across valve 38 is about 30 to 40 p.s.i. and serves to provide the desired stability of dispersion for suspension 29 at a flow value through meter 34 that corresponds to the desired flow rate into line 18. When so adjusting apparatus 10 elements, and ball valve 38 in particular, with a flow-meter 34 having a 67 gallon per hour rating, the flow readings, without an orifice as 116, also were unchanging during the operation of the apparatus 10 as abovegiven, for example:

| Time—minutes of operation— | Reading |
|---|---|
| 0 | 26 |
| 10 | 25 |
| 20 | 25 |
| 30 | 25 |
| 45 | 25 |
| 105 | 25 |

This rate of feed corresponds to a predetermined feed which is the suggested feed rate of Dacthal per acre and this is accomplished notwithstanding any variation in pressure and solid content of water in line 18 and as above described and sustantiated in detail by the data provided in our application Ser. Nos. 632,081 and 546,443.

The pressure drop across the orifice 116, about 40 p.s.i. not only provides for the continuous and even distribution of the suspensions of Atrazine and Propazine and Dacthal passed from the tank 22 to flow meter 34 and into the line 18 as described for the liquid solution described in our related application Ser. Nos. 632,081 and 546,443, but also in Examples 1, 2 and 3, the discharge from line 44 (as diagrammatically shown in FIGURE 5) into the water 60 on the pipe 18, is a stable suspension. It stays suspended for at least 15 minutes as a milky white suspension which is entirely adequate for transfer through 4,000 ft. of 8″ pipe when used with a pump as 14 which provides 1,100 gallons per minute discharge. The difference in readings on the thermometers 235 and 241 indicates that an adequate energy input is provided to create an adequate velocity through the orifice 116 to create a sufficiently stable dispersion of those particles of insoluble wettable powders for the travel thereof through an irrigating system such as 18 and 19 for application thereof to the field as 67 and the crops thereon. The adjustability of the return valve 32 provides for raising the pressure (read at 36) to maintain such pressure differential. However, the temperature differential is readily measured without flow interference and serves to indicate the presence of an orifice.

TABLE IV.—Readings on Operation of Examples 1, 2, and 3

| Temperature reading point | Run No. 1, temp., ° F. | Run No. 2, temp., ° F. | Run No. 3, temp., ° F. |
|---|---|---|---|
| 225 | 79 | 80 | 89 |
| 227 | 80.5 | 81 | 91 |
| 242 | 81 | 82 | 91 |
| 235 | 80.5 | 82 | 91 |
| 241 | 81.5 | 82.5 | 92 |

Pressure reading at 36 was 110 p.s.i. in all these examples.

Standard pressure gauges as 335 and 325 may be provided at points 135 and 125, and also at 341 to more closely control the above described operation of apparatus 10.

The fields 67, 68, and 69 are crop supporting fields and the pesticides herein described (fungicides, herbicides, and insecticides) are applied to such crops as well as to the soil and lands of such fields.

We have observed that while herbicides and conventional fluid proportioners and irrigating apparatuses are well known, the application of such fluid proportioners to irrigation waters to apply herbicides and the like through irrigation apparatuses to the land has not been practical. The traveling sprinklers that move continuously stepwise while spraying such as in U.S. Patents 2,726,895, 2,604,359 and 2,893,643 have pressure pulses in the lines that feed water thereto which make control according to pressure undesirable. Other traveling sprinklers as U.S. Patent 3,230,969 do not deliver water while moving but stay in one position for a fixed length of time while delivering water then, prior to moving to the next station and then sprinkling again for a fixed time, dump all the water theretofore in the distributing line at the particular location from which such sprinkling was done prior to moving to the next position. This makes feed of fertilizer proportional to the volume of fluid distributed undesirable.

Further, in all such apparatuses the amount of pressure required in a line to get to a particular operating position station at variable distances from the water source varies when the volume of flow delivered to the apparatus is the same or the volume varies if the pressure is the same. Further still, the pressure in the line varies as the sprinkler spray is directed towards or away from the wind and the volume accordingly varies inversely as the pressure which pressure in turn is subject to the vagaries of the wind. Even in the apparatuses, e.g., United States Patent 1,068,797 (Mathers) which stay at a fixed position in the field and sprinkle water through rotating arms, the pressure in the line and the volume delivered vary periodically and if herbicide is fed to the land in amounts that are metered proportional to the amount of water only there is a variation in the amount of herbicide applied to each area of land.

Also, the solid debris usually carried by irrigation waters makes the use of the orifice plates used to measure the liquid passing through irrigation water distribution pipes to irrigating apparatus that distribute the water to the land impractical because such solids build up on both sides of the orifice plates. Such accumulations render such orifice plates substantially unusable for purposes of any accurate flow measurements for control of the volume of liquid fertilizer to be added to such liquid. Further still, the pressure on an irrigation line undergoes spurts or changes caused by vibration and by clogging or freedom from clogging by silt of the filters which are in series with the pumps as well as because of the operation of the presently available irrigating apparatuses used to apply water to the land. Further still, the amount of water applied to each of several sections of land may vary widely during the same period of a few days of irrigating a large farm tract. This is because of the varying amounts of water required by the soils of each of the different sections or portions of the land due to the different conditions of the crops thereon and the demand of different crops on different, although adjacent, fields. Further still, the amount of water to be applied to the same land varies at different times, i.e., more may be required during hot late summer day than during the earlier summer and according to the capacity of the well and the soil. Accordingly, a process or apparatus providing chemicals in proportion to the amount of water added to such land will require at least the frequent replacement of orifice plates or venturi tubes because of the very large range in amounts of water applied to any one portion of land or during any one application and such repeated or periodic replacement is impractical.

The size of the irrigation pipes and the needed range in flow rates for irrigation waters makes venturi tubes for such application unduly expensive. Accordingly, notwithstanding the availability of irrigating apparatuses and availability of herbicides and fluid proportioners there is not prior to our invention a method of applying herbicides to the ground utilizing irrigation apparatus that is practical, even though it is known that adequate treatment is necessary for competitive crop yield and excess addition of herbicide to land is not only expensive but also causes a residue in the crops subsequently raised on that land and such excessive addition may cause harm to the consumers of such crops.

This process additionally provides that wettable insoluble powders as herbicides may be kept in suspension effectively for application to plants through water transport system of substantial length as above described without any additional power requirements on the irrigation pumps as 14 or in the conduit as 18 from the pump 14 to the irrigation distribution system elements as 19. This is in spite of the fact that conventional teachings are that increased fluid velocities are necessary to prevent particles of the size range of such water insoluble wettable powders from settling and that the clogging of nozzles by material which settled from the liquid suspensions heretofore used for this purpose had been a problem in this art.

More particularly, for cereal plants, growing points are located at a crown at or below the soil surface and are wrapped within bases of older leaves, hence, for such purpose the selective foliage translocated sprays as:

2,4-D(2,4-dichlorophenoxyacetic acid),
4-(MCPB) 4-(2-methyl-4-chlorophenoxy)-butyric acid,
Dalapon (sodium 2,2-dichloro-propionate), and
Herbisan-5-(bis-ethyl xanthogen), are particularly desirable; however, as these are of extremely low solubility in water the promise of efficiency of their action is not realized by lack of presently available method of application thereof. By the process of this invention which provides for the use of a large amount of water with, and to carry, such relatively water insoluble chemicals, relatively water insoluble chemicals are carried by the large volume of water rapidly via the soil to the weed roots and plant system and avoid the delay or destruction of such chemicals concomitant on adsorption of such chemicals on soil particles.

We claim:
1. A process for treating land and crops thereon with wettable powders of herbicides, fungicides and insecticides, comprising steps of:
   (a) mixing the said wettable powders with water and forming a first suspension thereof,
   (b) pressurizing the said first suspension and bringing it to a first, high, pressure level,
   (c) passing the pressurized liquid suspension through an adjustable orifice at a predetermined rate and thereby lowering the pressure of said liquid to a second, lower, pressure level and forming a second, more stable suspension thereof,
   (d) concurrently raising water from below the ground at a first site and raising its pressure to a water pressure within a range having a maximum lower than the value of said second pressure level, said water pressure of said water within said range being a varying pressure,
   (e) passing the second suspension at such second, lower, level of pressure into said stream of water at said range of pressure, and mixing the second suspension and the water, and
   (f) passing the resulting admixture to a liquid distributor located on said land at a distance from said first site and distributing said admixture on said land and crops.

2. Process as in claim 1 wherein the pressure of said liquid suspension is lowered at least 30 pounds per square inch from said first to said second pressure level.

3. Process as in claim 2 comprising the added steps of shutting the water flow to the said distributor and raising the pressure in said stream of water, automatically stopping the flow of said second suspension into said stream of water, moving said distributor to another area of land, locating said distributor on said another area of land and connecting said distributor to a source of water, passing said pressurized first suspension through the said adjustable orifice at a predetermined constant rate and then lowering the pressure of said suspension to said second lower pressure level, again passing the second suspension at said lower pressure to said stream of water at said range of lower pressure and again mixing the second suspension with said stream and passing the resultant mixture of said second stable suspension and said stream to said distributor and to said second area of land.

4. Process as in claim 3 comprising the step of continually mixing the components of said first suspension while said flow of said second suspension into said stream of water has stopped.

5. Process as in claim 4 wherein said powder is a water insoluble herbicide.

6. Process as in claim 4 wherein said powder is a water insoluble insecticide.

7. Process as in claim 4 wherein said powder is a water insoluble fungicide.

8. Apparatus for distributing pesticide to land and crops comprising a container for a liquid pesticide suspension, a conduit therefrom leading to a first pump means to raise the pressure of said liquid suspension and connected thereto, outlet means from said pressure raising first pump means leading to a pressure indicating means and connected operatively thereto, an adjustable pressure relief valve connected to said outlet means, a flowmeter with an inlet and outlet, and an inlet of said flowmeter connected to said outlet means from said pressure raising first pump means, the outlet of the pressure relief means operatively connected to said container, a flow regulating means operatively attached to the outlet end of said flowmeter, said flow regulating means provided with an outlet means, a check valve, that outlet means connected to the inlet of said check valve, a water well, a second pump operatively attached to that water well, a motor operatively attached to that second pump, a discharge line operatively attached to the second pump, a moving irrigator operatively attached to the line, the outlet of said check valve is operatively connected to said line, a shaft is connected to the motor and driven thereby, and said shaft is connected to the second pump and drives the second pump and is connected to and drives the first pump means for raising the pressure of said liquid suspension, liquid agitating means operatively attached to said container for liquid pesticide suspensions.

9. Apparatus as in claim 8 wherein said agitating means is operatively attached to driving means therefor and said driving means is operatively attached to said shaft which is operatively attached to said motor and driven thereby.

10. Apparatus as in claim 9 comprising also conduit means between said flowmeter and said flow regulating means, a temperature sensing means attached to said conduit; a liquid conduit between said flow regulating means and said check valve and a temperature sensing means operatively attached to said conduit.

References Cited
UNITED STATES PATENTS

| | | | |
|---|---|---|---|
| 3,326,232 | 6/1967 | Stamps et al. | 239—212 |
| 3,375,976 | 4/1968 | Stamps et al. | 239—1 |

EVERETT W. KIRBY, Primary Examiner

U.S. Cl. X.R.
47—1; 137—344; 239—212, 142, 75